3,223,736
PREPARATION OF ALKYL PHOSPHINES FROM HYDROCARBON PHOSPHITES AND ALKYL SODIUM COMPOUNDS
Ingenuin Hechenbleikner and Kenneth R. Molt, Cincinnati, Ohio, assignors to Carlisle Chemicals Works, Inc., Reading, Ohio, a corporation of Ohio
No Drawing. Filed July 20, 1962, Ser. No. 211,436
8 Claims. (Cl. 260—606.5)

The present invention relates to novel methods of preparing organometallic compounds.

Various methods have been employed in the past to prepare organometallic derivatives of boron, silicon, aluminum, antimony, germanium, arsenic, phosphorus and bismuth. Such procedures suffer from the disadvantages of being too costly and some require high pressure equipment. Also, in many cases, the yields are not as high as desired. Thus, the yield of triamyl phosphine from 1 mole of $PCl_3$ and 3 moles of amyl sodium is only 22% and the yield of tetrabutyl silicon from 1 mole of $SiCl_4$, 4.7 moles of butyl sodium is only 33.8%.

It is an object of the present invention to prepare organometallic derivatives of boron, silicon, aluminum, antimony, tin, germanium, arsenic, bismuth, and phosphorus by an improved process.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that the objects can be attained by reacting an alkoxy, aryloxy, haloaryloxy or aralkyloxy substituted metal with an alkyl sodium, aryl sodium, substituted aryl sodium or aralkyl substituted sodium to produce an organometallic compound.

The equation for the reaction is as follows:

where R is hydrocarbon, e.g., alkyl, aryl, or aralkyl or is substituted aryl, e.g., alkoxy aryl or haloaryl, Me is B, Si, Al, Sb, Sn, Ge, As, P or Bi, $n$ is an integer which corresponds to the valence state of the metal, i.e., 3 to 5, $m$ is an integer between 1 and the valence of the metal.

When it is desired to replace all of the RO groups by R' there should be employed at least as many moles of the R'Na compound as equal the value of $n$. An excess of the R'Na compound can be employed, e.g., from 1 to 10 moles, although a large excess is normally not needed to insure good yields. If the number of moles of the R'Na compound is less than the value of $n$ then the product will have some RO groups in addition to the R' group attached to the Me. In actual practice when the moles of R'Na are less than the value of $n$ it has been found that a mixture of several products are obtained having different numbers of RO and R' groups attached to the Me. These products can be separated by fractional distillation or other standard separatory procedures.

Among the compounds which can be prepared by the present invention are trimethyl phosphine, tripropyl phosphine, tributyl phosphine, tri-sec. butyl phosphine, tri-tert. butyl phosphine, triisobutyl phosphine, propyl dibutyl phosphine, triamyl phosphine, trioctyl phosphine, triisooctyl phosphine, trisdecylphosphine, trioctadecyl phosphine, triphenyl phosphine, tri-p-tolyl phosphine, tri-o-tolyl phosphine, tri-m-tolyl phosphine, tri-p-butylphenyl phosphine, tri-p-decylphenyl phosphite, tri-α-naphthyl phosphine, tri-β-naphthyl phosphine, tricyclohexyl phosphine, tricyclopentyl phosphine, tris-(o-methoxyphenyl) phosphine, tris-(p-ethoxyphenyl) phosphine, tris-(o-chlorophenyl) phosphine, tris-(p-bromophenyl) phosphine, tris-(m-fluorophenyl) phosphine, tribenzylphosphine, dibutylphosphorus ethoxide, butylphosphorus dipentoxide, tetrabutyl silicon, tetrapropyl silicon, tetraethyl silicon, tetradecyl silicon, tetraoctyl silicon, tetraoctadecyl silicon, dibutyl silicon diethoxide, butyl silicon triethoxide, tributyl silicon ethoxide, tetraphenyl silicon, tetra-p-tolyl silicon, tetra-o-methoxyphenyl silicon, tetra-α-naphthyl silicon, tetrabenzyl silicon, tetra sec. butyl silicon, tetraethyl silicon, tetramethyl silicon, trimethyl boron, triethyl boron, tributyl boron, trioctyl boron, trioctadecyl boron, triphenyl boron, tri-m-tolyl boron, tri-p-octylphenyl boron, dioctylboron butoxide, tetraphenyl tin, tetrabutyl tin, tetrapropyl tin, tetraoctyl tin, tetraisooctyl tin, tetramethyl tin, tetrabenzyl tin, tetra-o-ethoxyphenyl tin, dibutyl tin diethoxide, butyl tin tributoxide, triamyl tin octoxide, tetraamyl tin, triisopropyl aluminum, tributyl aluminum, triethyl aluminum, trioctyl aluminum, dibutyl aluminum isopropoxide, triphenyl aluminum tributyl stibine, triphenyl stibine, tripropyl arsine, trihexyl arsine, tetrabutyl germanium, tetraphenyl germanium and triphenyl arsine.

As the starting alcoholates of the metals there can be used trimethyl phophite, triethyl phosphite, tributyl phosphite, tri-(2-chloroethyl) phosphite, tri-(4-chlorobutyl) phosphite, trioctyl phosphite, tris decyl phosphite, triphenyl phosphite, tri-p-cresyl phosphite, tri-o-chlorophenyl phosphite, tri-p-bromophenyl phosphite, tri-m-cresyl phosphite, tri sec. butyl phosphite, tribenzyl phosphite, tetramethyl silicate, tetraethyl silicate, tetrapropyl silicate, diphenyldecyl phosphite, tri-α-naphthyl phosphite, tetraoctyl silicate, dibutyl dioctyl silicate, trimethyl borate, triethyl borate, tripropyl borate, tributyl borate, trioctyl borate, triphenyl borate, tin tetrabutoxide, tin tetramethoxide, tin tetraoctoxide, tin tetraphenoxide, aluminum isopropylate, aluminum methylate, aluminum butylate, aluminum triphenoxide, antimony, tributoxide, germanium tetrabutoxide, antimony triphenoxide, and arsenic tripentoxide.

As the organosodium compound starting material there can be used methyl sodium, ethyl sodium, propyl sodium, isopropyl sodium, butyl sodium, sec. butyl sodium, tert. butyl sodium, isobutyl sodium, amyl sodium, hexyl sodium, cyclohexyl sodium, cyclopentyl sodium, benzyl sodium, octyl sodium, decyl sodium, isooctyl sodium, octadecyl sodium, phenyl sodium, o-tolyl sodium, p-tolyl sodium, m-tolyl sodium, p-ethylphenyl sodium, o-butylphenyl sodium, α-naphthyl sodium, β-naphthyl sodium, p-methoxyphenyl sodium, o-ethoxyphenyl sodium, p-chlorophenyl sodium, o-bromophenyl sodium, o-fluorophenyl sodium.

The organosodium compound can be preformed or can be formed in situ from metallic sodium and a halo-hydrocarbon or the like such as 1-chlorobutane, 1-bromobutane, 2-chlorobutane, 1-bromo-2-methyl propane, 2-bromoethyl propane, 1-chloropentane, 1-chlorooctane, monochlorobenzene, monobromo benzene, 1-bromoanisole, etc. A dichlorobenzene can be treated with sodium so that only one of the chlorine atoms react.

There can be employed inert solvents including hydrocarbons such as varnish makers' and painters' naphtha (V.M. and P. naphtha), hexane, toluene, benzene, octane.

The reaction can be carried out at atmospheric, subatmospheric or super atmospheric pressure. Frequently the reaction is exothermic and external cooling is employed.

Unless otherwise indicated all parts and percentages are by weight.

Example 1

A 12-liter flask containing 676 grams of sodium (29.4 moles) and 400 grams of V.M. and P. naphtha under an atmosphere of nitrogen was heated to 110° C. until the sodium was melted. The mixture was agitated vigorously by a Premier Mill Laboratory Dispersator to disperse the sodium into microscopic particles of less than 100 microns in diameter. After cooling to 30° C. a solution of 1415 grams (4.55 moles) of triphenyl phosphite in 1395 grams (15.05 moles) of 1-chlorobutane was added over a 2-hour period using a cooling bath to hold the temperature at 30° to 50° C. The reaction mixture was stirred an additional two hours and then washed twice with 6 liters of water. The solvent was removed in vacuo leaving 810 grams (88% yield) of crude tributyl phosphine. Fractional distillation yielded 765 grams of the tributyl phosphine as a colorless liquid, B.P. 70–74° C. at 0.5 mm., $N_D^{25}$ 1.4600.

Example 2

The procedure of Example 1 was repeated except that 4.55 moles of trimethyl phosphite were substituted for the triphenyl phosphite. The yield of crude tributyl phosphine was 94.7%, B.P. 110–125° C. at 8 mm.

Example 3

Trioctyl phosphine was prepared by the procedure of Example 1 but utilizing 4.0 moles of sodium dispersed in 300 grams of naphtha and diluted by 300 grams of hexane. To this mixture was added 0.6 mole of triphenyl phosphite dissolved in 1.8 moles of n-octyl chloride over a period of 40 minutes at 40–60° C. The yield of crude trioctyl phosphine was 191 grams (88%), B.P. 190–210° C. at 1 mm., $N_D^{25}$ 1.4683.

Example 4

A solution of 3.15 moles of monochlorobenzene in 200 grams of benzene was added to 6.0 moles of sodium dispersed in 400 grams of toluene over a period of 30 minutes. A cooling bath was used to hold the temperature at 20 to 30° C. Then there was added 0.9 mole of trimethyl phosphite over a 20 minute period at 10 to 20° C. After stirring at 20 to 40° C. for two hours the mixture was heated to 80° C. for one hour. One liter of water was used to wash the reaction mixture. The solvent was removed in vacuo and the crude triphenyl phosphine was isolated by distillation; yield 201 grams as yellow crystals (85.1% of theory), M.P. 67–73° C., B.P. 150–170° C. at 0.05 mm.

Example 5

A solution of 0.040 mole of trimethyl phosphite in 0.137 mole of o-bromoanisole was added slowly to 0.28 mole of sodium dispersed in 200 grams of V.M. and P. naphtha at 15 to 20° C. After stirring for two hours at 20–40° C. and one hour at 80° C., the mixture was treated with 200 grams of water. The tris-(o-methoxyphenyl) phosphine prepared was removed by filtration and vacuum dried at 80° C., yield 11.1 grams (78.7% of theory), M.P. 203–205° C. (204° C. in the literature). The product was a light yellow powder.

Example 6

A solution of 0.45 mole of tetraethyl silicate in 2.1 moles of 1-chlorobutane was added to a dispersion of 4.1 moles of sodium in 400 grams of V.M. and P. naphtha over a 30 minute period at 30–50° C. The reaction mixture was stirred an additional two hours, washed with water and the solvent stripped in vacuo. The tetrabutyl silicon formed was isolated by distillation, yield 100 grams (86.5% of theory), B.P. 90–100° C. at 0.5 mm., $N_D^{20}$ 1.4358.

Example 7

A solution of 1.0 mole of tetraethyl silicate in 2.1 moles of 1-chlorobutane was added to a dispersion of 4.1 moles of sodium in 400 grams of V.M. and P. naphtha over a one hour period at 20–30° C. The reaction mixture was filtered and the solvent removed in vacuo, yield of the crude product was 180 grams (77.4% of theory calculated as dibutyl silicon diethoxide). Fractional distillation of the crude product produced the following fractions:

| Fraction | Boiling Point, ° C. | Yield, grams | $N_D^{20}$ |
|---|---|---|---|
| 1 | [1] 60–65 | 25 | 1.4050 |
| 2 | [1] 65–70 | 50 | 1.4128 |
| 3 | [1] 70–75 | 91 | 1.4180 |
| 4 | Residue | 14 | 1.4290 |

[1] At 1.5 mm.

Fraction 1 was a mixture of mostly butyl silicon triethoxide; fraction 2 was mostly dibutyl silicon diethoxide mixed with a little butyl silicon triethoxide, fraction 3 was essentially pure dibutyl silicon diethoxide and the residue was a mixture of dibutyl silicon diethoxide and tributyl silicon ethoxide.

Example 8

A solution of 0.6 mole of tributyl borate in 2.2 moles of 1-chlorobutane was added to dispersion of 4.4 moles of sodium in 400 grams of V.M. and P. naphtha over a one hour period at 30–40° C. After stirring for five hours at 30–60° C. the solution was washed with water, the solvent removed in vacuo and the tributyl boron produced distilled, yield 21 grams (19.1% of theory), as a colorless, pyrophoric liquid, B.P. 70–72° C. at 0.5 mm.

We claim:
1. A process of preparing a compound having the formula PR′₃ comprising reacting one mol of a compound having the formula (RO)₃P with at least 3 mols of a compound having the formula R′Na wherein R is selected from the group consisting of alkyl, chloroalkyl, phenyl, cresyl, chlorophenyl, bromophenyl and benzyl, and R′ is selected from the group consisting of alkyl and lower alkoxy phenyl.

2. A process of preparing a trialkyl phosphine comprising reacting one mol of a phosphite selected from the group consisting of trialkyl phosphites, triphenyl phosphite, tricresyl phosphite and tribenzyl phosphite with at least 3 mols of alkyl sodium.

3. A process of preparing a trialkyl phosphine comprising reacting one mol of tricresyl phosphite with at least 3 mols of an alkyl sodium.

4. A process of preparing a trialkyl phosphine comprising reacting one mol of triphenyl phosphite with at least 3 mols of an alkyl sodium.

5. A process of preparing a trialkyl phosphine comprising reacting one mol of a trialkyl phosphite with at least 3 mols of an alkyl sodium.

6. A process according to claim 1 wherein R is alkyl.

7. A process according to claim 1 wherein R′ is alkyl.

8. A process of preparing a tris-(alkoxyaryl) phosphine comprising reacting one mole of a member of the group consisting of trialkyl phosphite, triphenyl phosphite, tricresyl phosphite and tribenzyl phosphite with at least three moles of a lower alkoxy phenyl sodium.

(References on following page)

References Cited by the Examiner

UNITED STATES PATENTS

| | | | |
|---|---|---|---|
| 2,985,678 | 5/1961 | Chappelow et al. | 260—448.2 |
| 3,030,406 | 4/1962 | Washburn et al. | 260—606.5 |
| 3,090,801 | 5/1963 | Washburn et al. | 260—606.5 |

FOREIGN PATENTS

| | | |
|---|---|---|
| 573,906 | 12/1945 | Great Britain. |
| 668,523 | 3/1952 | Great Britain. |
| 814,647 | 6/1959 | Great Britain. |

OTHER REFERENCES

Eaborn: "Organosilicon Compounds," Academic Press, N.Y., publ. 1960, pp. 25–31.

Organic Chemistry, Paul Karrer (4th ed.), p. 156, 1950.

Takami: "Chem. Abstr.," vol. 52, 1958, col. 9982.

Willans: "Chemistry and Industry," Feb. 23, 1957, pp. 235–6.

TOBIAS E. LEVOW, *Primary Examiner.*

SAMUEL H. BLECH, CHARLES B. PARKER,
*Examiners.*